(12) United States Patent
Zhu

(10) Patent No.: US 12,057,009 B2
(45) Date of Patent: Aug. 6, 2024

(54) ADJUSTMENT METHOD AND APPARATUS FOR DRIVING WAVEFORM, DEVICE, AND READABLE STORAGE MEDIUM

(71) Applicant: Honor Device Co., Ltd., Shenzhen (CN)

(72) Inventor: Jianwei Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/796,827

(22) PCT Filed: Jan. 21, 2022

(86) PCT No.: PCT/CN2022/073174
§ 371 (c)(1),
(2) Date: Aug. 1, 2022

(87) PCT Pub. No.: WO2022/242218
PCT Pub. Date: Nov. 24, 2022

(65) Prior Publication Data
US 2024/0185694 A1 Jun. 6, 2024

(30) Foreign Application Priority Data
May 20, 2021 (CN) .......................... 202110552989.7
Jun. 16, 2021 (CN) .......................... 202110668265.9

(51) Int. Cl.
*G08B 6/00* (2006.01)
*H02P 25/034* (2016.01)
(52) U.S. Cl.
CPC .............. *G08B 6/00* (2013.01); *H02P 25/034* (2016.02)
(58) Field of Classification Search
CPC ........ H02P 25/032; H02P 25/06; H02P 6/006; H02P 7/02; H02P 7/00; H02P 7/025;
(Continued)

(56) References Cited
U.S. PATENT DOCUMENTS 9,245,429 B2   1/2016 Cruz-Hernandez et al.
10,026,276 B2  7/2018 Rank et al.
(Continued)

FOREIGN PATENT DOCUMENTS

CN     105322842 A     2/2016
CN     106059440 A    10/2016
(Continued)

OTHER PUBLICATIONS

Jianli Chen, Method for driving a linear resonant actuator, and Terminal, Jul. 12, 2018, Clarivate Analytics, pp. 1-49 (Year: 2018).*
(Continued)

*Primary Examiner* — Antony M Paul
(74) *Attorney, Agent, or Firm* — Slater Matsil, LLP

(57) ABSTRACT

Embodiments of this application provide an adjustment method and apparatus for a driving waveform, a device, and a storage medium. In the adjustment method for a driving waveform, a vibration description file is obtained; a waveform type described in the vibration description file is recognized; and a driving waveform of a linear motor is generated according to a vibration parameter described in the vibration description file and a resonant frequency of the linear motor in response to recognizing that the waveform type described in the vibration description file is a transient waveform. In this case, it can be seen that the driving waveform of the linear motor is generated according to the vibration parameter described in the vibration description file and the resonant frequency of the linear motor in a case that the waveform type described in the vibration description file is the transient waveform.

19 Claims, 6 Drawing Sheets

(58) Field of Classification Search
CPC ........ H02P 7/29; G06F 3/016; G06F 3/04847; G06F 3/0488; H04M 19/047; G01H 13/00
See application file for complete search history.

(56) References Cited

U.S. PATENT DOCUMENTS

| | | |
|---|---|---|
| 10,394,326 B2 | 8/2019 | Ono et al. |
| 10,965,803 B2 | 3/2021 | Li et al. |
| 10,991,499 B2 | 4/2021 | Konradi et al. |
| 2005/0237011 A1 | 10/2005 | Woods et al. |
| 2016/0132117 A1 | 5/2016 | Adachi et al. |
| 2019/0391653 A1 | 12/2019 | Ono et al. |
| 2021/0110841 A1 | 4/2021 | Weber et al. |

FOREIGN PATENT DOCUMENTS

| | | | |
|---|---|---|---|
| CN | 106133650 A | 11/2016 | |
| CN | 109274309 A | 1/2019 | |
| CN | 109887528 A | 6/2019 | |
| CN | 111030412 A | 4/2020 | |
| CN | 111552377 A | 8/2020 | |
| CN | 111954861 A | 11/2020 | |
| CN | 111966211 A | 11/2020 | |
| CN | 112269895 A | 1/2021 | |
| CN | 112506341 A | 3/2021 | |
| EP | 2743800 A2 | 6/2014 | |
| EP | 2846221 A1 | 3/2015 | |
| WO | 2018126560 A1 | 7/2018 | |
| WO | WO-2018126560 A1 * | 7/2018 | ............. H02P 25/06 |
| WO | 2018223535 A1 | 12/2018 | |

OTHER PUBLICATIONS

Jonghyun Ryu et al., "+posVibEditor: Graphical Authoring Tool of Vibrotactile Patterns" 2008 IEEE International Workshop on Haptic Audio Visual Environments and Games; Ottawa, Canada, Oct. 18-19, 2008; 6 pages.

* cited by examiner

ADJUSTMENT METHOD AND APPARATUS FOR DRIVING WAVEFORM, DEVICE, AND READABLE STORAGE MEDIUM

CROSS-REFERENCE TO RELATED APPLICATIONS

This application is a national stage of International Application No. PCT/CN2022/073174, filed on Jan. 21, 2022, which claims priority to Chinese Patent Application No. 202110552989.7, filed on May 20, 2021, and claims priority to Chinese Patent Application No. 202110668265.9, filed on Jun. 16, 2021. The disclosures of the aforementioned application is hereby incorporated by reference in its entirety.

TECHNICAL FIELD

This application relates to the field of data processing technologies, and in particular, to an adjustment method and apparatus for a driving waveform, a device, and a readable storage medium.

BACKGROUND

Because stroke directions are different, linear motors may be categorized into an X-axis linear motor and a Z-axis linear motor. These two types of linear motors need to be driven by different transient waveforms. In addition, even linear motors of the same type need to be driven by different transient waveforms when resonant frequencies of the linear motors are different. Therefore, a solution that can mask differences in motors is required to generate a transient waveform.

SUMMARY

This application provides an adjustment method and apparatus for a driving waveform, a device, and a storage medium, so as to generate a transient waveform capable of masking differences in motors to drive a linear motor.

To achieve the foregoing objective, this application provides the following technical solutions.

According to a first aspect, this application provides an adjustment method for a driving waveform. The adjustment method includes: obtaining a vibration description file; recognizing a waveform type described in the vibration description file; and generating a driving waveform of the linear motor according to a vibration parameter described in the vibration description file and a resonant frequency of the linear motor in response to recognizing that the waveform type described in the vibration description file is a transient waveform.

It can be seen from the content of the first aspect that: the driving waveform of the linear motor is generated according to the vibration parameter described in the vibration description file and the resonant frequency of the linear motor in a case that the waveform type described in the vibration description file is the transient waveform, so that it is ensured that the generated driving waveform of the linear motor can be adapted to the resonant frequency of the linear motor, and the transient waveform that masks differences in motors is generated to drive the linear motor.

In a possible implementation, the method includes: generating a plurality of half-cycle waveforms according to a parameter of a waveform array that is adapted to the resonant frequency of the linear motor; and combining the generated plurality of half-cycle waveforms to obtain the transient waveform described in the vibration description file, so that the driving waveform of the linear motor is generated according to the vibration parameter described in the vibration description file and the resonant frequency of the linear motor.

In a possible implementation, the generating a driving waveform of the linear motor according to a vibration parameter described in the vibration description file and a resonant frequency of the linear motor includes: selecting a driving waveform whose frequency matches the resonant frequency of the linear motor from a plurality of pre-stored driving waveforms, where the driving waveform whose frequency matches the resonant frequency of the linear motor meets a vibration parameter requirement of the transient waveform described in the vibration description file.

In a possible implementation, the plurality of driving waveforms are stored in groups, and one group of driving waveforms corresponds to one resonant frequency of the linear motor; each group of driving waveforms includes at least one driving waveform, and each driving waveform is adapted to a frequency requirement of a vibration waveform of the linear motor; and based on the above, a group of driving waveforms whose frequency matches the resonant frequency of the linear motor may be selected from a plurality of groups of driving waveforms, and the driving waveform that meets the vibration parameter requirement of the transient waveform described in the vibration description file is determined from the selected group of driving waveforms. In this way, it can be implemented the driving waveform whose frequency matches the resonant frequency of the linear motor is selected from the plurality of pre-stored driving waveforms, where the driving waveform whose frequency matches the resonant frequency of the linear motor meets the vibration parameter requirement of the transient waveform described in the vibration description file.

In a possible implementation, the generating a driving waveform of the linear motor according to a vibration parameter described in the vibration description file and a resonant frequency of the linear motor includes: selecting a vibration waveform that meets a vibration parameter requirement of the transient waveform described in the vibration description file from a plurality of pre-stored vibration waveforms; and processing the selected vibration waveform to obtain a driving waveform whose frequency matches the resonant frequency of the linear motor.

According to a second aspect, this application provides an adjustment apparatus for a driving waveform. The adjustment apparatus includes: an obtaining unit, a recognition unit, and a generation unit. The obtaining unit is configured to obtain a vibration description file. The recognition unit is configured to recognize a waveform type described in the vibration description file. The generation unit generates a driving waveform of a linear motor according to a vibration parameter described in the vibration description file and a resonant frequency of the linear motor in a case that the waveform type described in the vibration description file is a transient waveform.

It can be seen from the content of the second aspect that: the generation unit generates the driving waveform of the linear motor according to the vibration parameter described in the vibration description file and the resonant frequency of the linear motor in a case that the waveform type described in the vibration description file is the transient waveform, so that it is ensured that the generated driving waveform of the linear motor can be adapted to the resonant frequency of the linear motor, and the transient waveform that masks differences in motors is generated to drive the linear motor.

In a possible implementation, when generating the driving waveform of the linear motor according to the vibration parameter described in the vibration description file and the resonant frequency of the linear motor, the generation unit is configured to: generate a plurality of half-cycle waveforms according to a parameter of a waveform array that is adapted to the resonant frequency of the linear motor; and combine the generated plurality of half-cycle waveforms to obtain the transient waveform described in the vibration description file.

In a possible implementation, when generating the driving waveform of the linear motor according to the vibration parameter described in the vibration description file and the resonant frequency of the linear motor, the generation unit is configured to: select a driving waveform whose frequency matches the resonant frequency of the linear motor from a plurality of pre-stored driving waveforms, where the driving waveform whose frequency matches the resonant frequency of the linear motor meets a vibration parameter requirement of the transient waveform described in the vibration description file.

In a possible implementation, the plurality of driving waveforms are stored in groups, and one group of driving waveforms corresponds to one resonant frequency of the linear motor; each group of driving waveforms includes at least one driving waveform, and each driving waveform is adapted to a frequency requirement of a vibration waveform of the linear motor; and when selecting the driving waveform whose frequency matches the resonant frequency of the linear motor from the plurality of pre-stored driving waveforms, where the driving waveform whose frequency matches the resonant frequency of the linear motor meets a vibration parameter requirement of the transient waveform described in the vibration description file, the generation unit is configured to: select a group of driving waveforms whose frequency matches the resonant frequency of the linear motor from a plurality of groups of driving waveforms; and determine the driving waveform that meets the vibration parameter requirement of the transient waveform described in the vibration description file from the selected group of driving waveforms.

In a possible implementation, when generating the driving waveform of the linear motor according to the vibration parameter described in the vibration description file and the resonant frequency of the linear motor, the generation unit is configured to: select a vibration waveform that meets a vibration parameter requirement of the transient waveform described in the vibration description file from a plurality of pre-stored vibration waveforms; and process the selected vibration waveform to obtain a driving waveform whose frequency matches the resonant frequency of the linear motor.

According to a third aspect, this application provides an electronic device, including a linear motor; one or more processors; a memory, storing a program; and the program, when executed by the one or more processors, causing the one or more processors to implement the adjustment method for a driving waveform according to any one of the first aspect and each of the possible implementations to generate a driving waveform to drive the linear motor to operate.

According to a fourth aspect, this application provides a readable storage medium, storing a computer program, the computer program, when executed by a processor, implementing the adjustment method for a driving waveform according to any one of the first aspect and each of the possible implementations.

In this application, based on the implementations according to the foregoing aspects, further combination may be performed, to provide more implementations.

BRIEF DESCRIPTION OF THE DRAWINGS

To describe the technical methods in the embodiments of this application more clearly, the following briefly describes the accompanying drawings required for describing the embodiments.

FIG. 3b is an example flowchart of functions implemented by the software architecture shown in FIG. 3a;

DETAILED DESCRIPTION OF ILLUSTRATIVE EMBODIMENTS

In the specification, claims, and accompanying drawings of this application, the terms "first", "second", "third", and so on are intended to distinguish between different objects but do not indicate a particular order.

In this application, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include one . . . " does not exclude other same elements existing in the process, the method, the article, or the device that includes the element.

A linear motor is arranged in an electronic device, and is configured to enable the electronic device to output a vibration sensation through vibration. In different scenarios of the electronic device, the linear motor is controlled to vibrate to generate different vibration effects, so that the user perceives the vibration sensation, and to prompt the user or give feedback to the user's operation. Details are as follows:

1. Different service scenarios (for example, a time prompt, Information receiving, an incoming call, an alarm clock, and a game) may correspond to different vibration effects.
2. As feedback to touch. For example, touch operations performed on different applications (for example, photo taking and audio playing) may correspond to different vibration effects. Touch operations performed on different areas of the display screen may also correspond to different vibration effects.

Figure 1A:
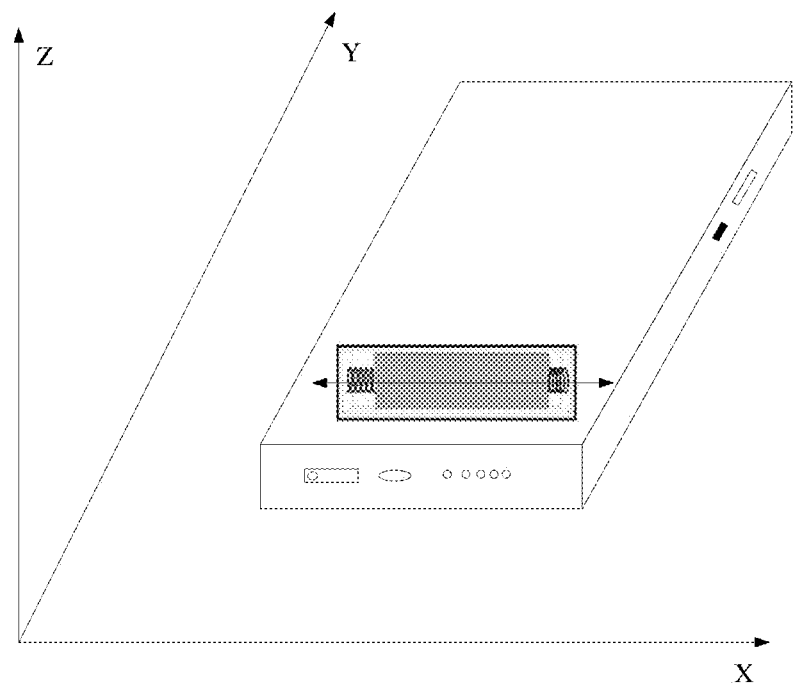
FIG. 1a is a diagram of the structure and an application example of an X-axis linear motor.
Figure 1B:
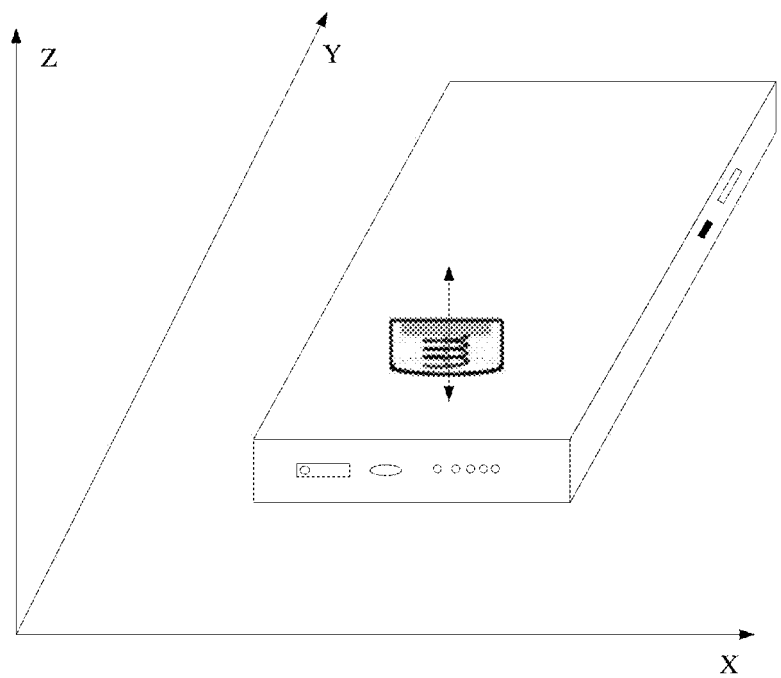
FIG. 1b is a diagram of the structure and an application example of a Z-axis linear motor.

Linear motors commonly used in an electronic device include an X-axis linear motor (also referred to as a square or a horizontal linear motor) and a Z-axis linear motor (also referred to as a circular or a vertical linear motor). FIG. 1a shows the structure and an application example of an X-axis linear motor. FIG. 1b shows the structure and an application example of a Z-axis linear motor.

As shown in FIG. 1a, an appearance of the X-axis linear motor is in a shape of a strip or a square. Assuming that an X-axis is a horizontal axis, a Y-axis is a vertical axis, and a Z-axis is a vertical axis perpendicular to the X-axis and the Y-axis, according to a placement direction, a rotor of the X-axis linear motor can move in an X-axis direction or a Y-axis direction to achieve a longer stroke. If the X-axis linear motor is mounted in the X-axis direction in an electronic device, the X-axis linear motor can provide a vibration sensation in the X-axis direction, and if the X-axis linear motor is mounted in the Y-axis direction, the X-axis linear motor can provide a vibration sensation in the Y-axis direction.

As shown in FIG. 1b, the appearance of the Z-axis linear motor is cylindrical, and the rotor can move in a Z-axis direction. The Z-axis linear motor is arranged in the electronic device, and can provide a vibration sensation in a thickness direction of the electronic device.

A resonant frequency of the linear motor is a key parameter for the linear motor to operate. The resonant frequency, also known as a resonance frequency, refers to a case in which a physical system (the linear motor) vibrates with a greater amplitude at a specific frequency than at other frequencies. The specific frequency is referred to as the resonance frequency. At the resonance frequency, a small driving force can cause the linear motor to generate great vibration. Therefore, the linear motor is generally driven to operate at the resonant frequency.

The vibration description file is one of the key elements for controlling the linear motor to vibrate: the vibration description file is configured to describe a vibration waveform of the linear motor, and the vibration waveform indicates various vibration parameters such as an amplitude and a frequency when a motor vibrates.

It can be seen that the function of the vibration description file is to instruct the motor how to vibrate, and therefore the user can configure an expected vibration effect through the vibration description file. In practice, the linear motor implements vibration. Therefore, the vibration effect is related to properties of the linear motor. Although the vibration description file is configured based on the expected vibration effect, the vibration generated by the linear motor controlled by the vibration description file may not necessarily achieve the expected vibration effect.

Based on characteristics of the foregoing linear motors of different types, the applicant finds in a process of researching that a linear motor cannot provide the expected vibration effect, which is mainly reflected as follows:

For linear motors of different types or linear motors of the same type, the resonant frequencies are different. Linear motors with different resonant frequencies are applicable to electronic devices. Therefore, a frequency of a transient driving waveform described in the same vibration description file cannot be adapted to the resonant frequency of each linear motor that implements vibration. For example, the vibration description file defines a vibration waveform with a frequency of 230 hz, and the resonant frequencies of linear motors that implement vibration are 150 hz and 230 hz. As described above, the resonant frequency of the linear motor is 150 hz, and the linear motor outputs a driving waveform with a frequency of 150 hz. In this way, it can be ensured that a small driving force causes the linear motor to generate great vibration. The frequency of the vibration waveform defined by the vibration description file is 230 hz, and the linear motor with the resonant frequency of 150 Hz outputs the vibration waveform with the frequency of 230 hz, which causes the vibration sensation outputted by the linear motor to fail to meet the requirement. Therefore, the vibration waveform described in the vibration description file needs to be adjusted, so that the vibration waveform is adapted to each resonant frequency of the linear motor that implements vibration, so as to ensure the expected vibration effect and the expected vibration sensation.

For the adjustment method for a vibration waveform of a linear motor disclosed in the embodiments of this application, the vibration waveform described in the vibration description file is adjusted based on the characteristics of the linear motor that implements vibration, so that the vibration waveform is adapted to the resonant frequency of the linear motor that implements vibration, to ensure the expected vibration effect and the expected vibration sensation.

The adjustment method for a vibration waveform of a linear motor disclosed in the embodiment of this application is applicable to the electronic device in which the linear motor is arranged. The electronic device in which the linear motor is arranged may be a device such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, a smartwatch, or the like.

Figure 2:
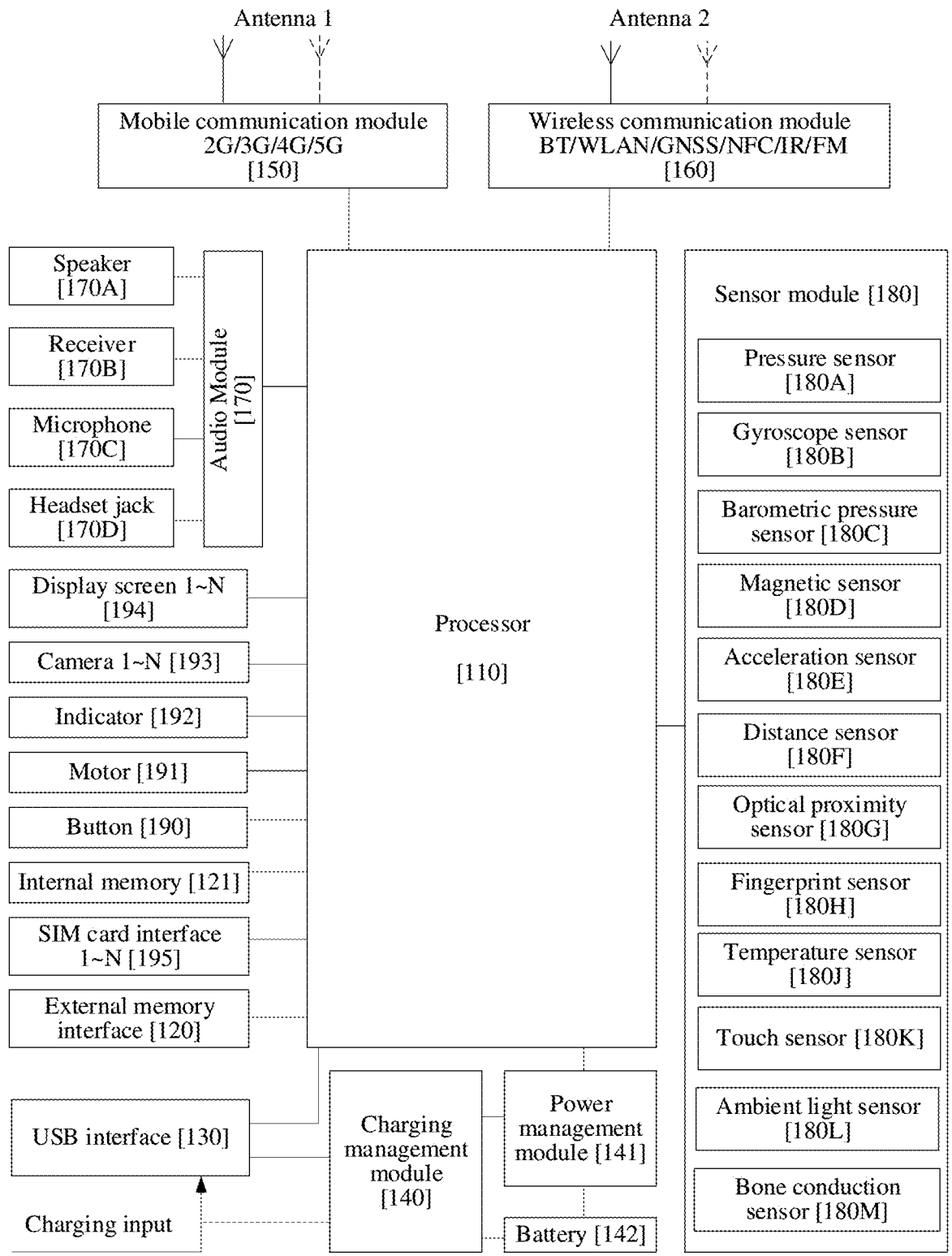
FIG. 2 is a schematic structural diagram of an electronic device according to an embodiment of this application.

The electronic device shown in FIG. 2 includes a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device. The controller may generate an operating control signal according to an instruction operation code and a sequence signal, to complete control of fetching and executing an instruction.

In this embodiment of this application, the processor 110 performs the adjustment method for a driving waveform provided in the following embodiments.

A memory may be further disposed in the processor 110, and is configured to store instructions and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement the function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is generally used to connect the processor 110 with the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement the function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device. The processor 110 communicates with the display screen 194 by using a DSI interface, to implement a display function of the electronic device.

The GPIO interface may be configured through software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, and the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device, or may be used for data transmission between the electronic device and a peripheral device. The USB interface may also be connected to a headset to play audios through the headset. The interface may alternatively be configured to connect to another electronic device such as an AR device.

It may be understood that a schematic interface connection relationship between the modules in this embodiment is merely an example for description, and constitutes no limitation on the structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from a charger. The charger may be a wireless charger or may be a wired charger. In some embodiments of wired charging, the charging management module 140 may receive charging input of a wired charger by using the USB interface 130. In some embodiments of wireless charging, the charging management module 140 may receive a wireless charging input through a wireless charging coil of the electronic device. When charging the battery 142, the charging management module 140 may further supply power to the electronic device through the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applicable to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 170A, the telephone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another function module may be disposed in a same component.

The wireless communication module 160 may provide a solution to wireless communication applicable to the electronic device, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components into which at least one communication processing module is integrated. The wireless communication module 160 receives an electromagnetic wave by using the antenna 2, performs frequency modulation and filtering on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communication module 150 of the electronic device are coupled, and the antenna 2 and the wireless communication module 160 of the electronic device are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (Beidou navigation satellite system, BDS), a quasi-zenith satellite system (quasi-zenith satellite system, QZSS) and/or a satellite based augmentation system (satellite based augmentation system, SBAS).

The electronic device implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device may include one or N display screens 194. N is a positive integer greater than 1.

A series of graphical user interfaces (graphical user interface, GUI) may be displayed on the display screen 194 of the electronic device, and these GUIs are main screens of the electronic device. Generally, a size of the display screen 194 of the electronic device is fixed, and only limited controls can be displayed in the display screen 194 of the electronic device. A control is a GUI element, which is a software component included in an application, and the control controls all data that the application handles and interaction operation about the data. The user can interact with the control through direct manipulation (direct manipulation) to read or edit information about the application. Generally, the control may include visual interface elements such as an icon, a button, a menu, a tab, a text box, a dialog box, a status bar, a navigation bar, and a widget. For example, in this embodiment of this application, the display screen 194 may display a virtual key.

The electronic device can implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a shooting scene. In some embodiments, the ISP may be disposed in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device may include one or N cameras 193, and N is a positive integer greater than 1.

The digital signal processor is configured to process a digital signal, and in addition to a digital image signal, may further process another digital signal. For example, when the electronic device performs frequency selection, the digital signal processor is configured to perform Fourier transform and the like on frequency energy.

The video codec is configured to compress or decompress a digital video. The electronic device may support one or more video codecs. In this way, the electronic device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

The external memory interface 120 may be configured to connect to an external storage card such as a micro SD card, to expand a storage capability of the electronic device. The external storage card communicates with the processor 110 by using the external memory interface 120, so as to implement a data storage function, such as storing a file such as music or a video in the external storage card.

The internal memory 121 may be configured to store computer executable program code, and the executable program code includes an instruction. The processor 110 runs the instruction stored in the internal memory 121, to perform various function applications and data processing of the electronic device 100. The internal memory 121 may include a program storage region and a data storage region. The program storage region may store an operating system, an application required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

In the embodiments of this application, the internal memory 121 stores an instruction used for performing the adjustment method for a driving waveform. The processor 110 can adjust the driving waveform described in the vibration description file by executing the instruction stored in the internal memory 121 to ensure that a video of the driving waveform is adapted to the resonant frequency of each linear motor, and mask differences between different resonant frequencies of different linear motors.

The electronic device may implement an audio function by using the audio module 170, the speaker 170A, the telephone receiver 170B, the microphone 170C, the headset jack 170D, the application processor, and the like, such as music playing or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may be used to listen to music or answer a call in a hands-free mode by using the speaker 170A.

The telephone receiver 170B, also referred to as a "receiver", is configured to convert an audio electrical signal into a sound signal. When the electronic device is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may speak with the mouth approaching the microphone 170C, to input a sound signal to the microphone 170C. At least one microphone 170C may be disposed in the electronic device. In some other embodiments, two microphones 170C may be disposed in the electronic device, to collect a sound signal and implement a noise reduction function. In some other embodiments, three, four, or more microphones 170C may be alternatively disposed in the electronic device, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device determines strength of pressure based on a change of the capacitance. When a touch operation is performed on the display screen 194, the electronic device detects strength of the touch operation by using the pressure sensor 180A. The electronic device may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device. In some embodiments, angular velocities of the electronic device around three axes (that is, an x axis, a y axis, and a z axis) may be determined through the gyroscope sensor 180B. The gyroscope sensor 180B may be used for image stabilization during photographing. For example, when the shutter is pressed, the gyro sensor 180B detects an angle at which the electronic device jitters, and calculates, based on the angle, a distance for which a lens module needs to compensate, and allows the lens to cancel the jitter of the electronic device through reverse motion, thereby implementing image stabilization. The gyroscope sensor 180B may also be used in navigation and a motion sensing game scene.

The barometric pressure sensor 180C is configured to measure barometric pressure. In some embodiments, the electronic device calculates an altitude by using a barometric pressure value measured by the barometric pressure sensor 180C, to assist in positioning and navigation.

The magnetic sensor 180D includes a Hall effect sensor. The electronic device may detect opening and closing of a flip cover or a leather case by using the magnetic sensor 180D. In some embodiments, when the electronic device is a clamshell phone, the electronic device may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect magnitudes of acceleration of the electronic device in various directions (generally on three axes). When the electronic device is stationary, a magnitude and a direction of gravity may be detected. The acceleration sensor may be further configured to recognize a posture of the electronic device, and is applied to switching between landscape orientation and portrait orientation, and applied to an application such as a pedometer.

The distance sensor 180F is configured to measure a distance. The electronic device may measure a distance through infrared or laser. In some embodiments, in a photographing scene, the electronic device may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The electronic device may emit infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that a user holds the electronic device close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The electronic device may adaptively adjust a luminance of the display screen 194 according to perceived brightness of the ambient light. The ambient light sensor 180L may be further configured to automatically adjust white balance during photo taking. The ambient light sensor 180L may further cooperate with the optical proximity sensor 180G to detect whether the electronic device is in a pocket, so as to prevent an accidental touch.

The fingerprint sensor 180H is configured to collect a fingerprint. The electronic device may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch control device". The touch sensor 180K may be disposed on the display screen 194. The touch sensor 180K and the display screen 194 form a touchscreen, which is also referred to as a "touch control screen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the electronic device, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure pulse signal obtained by the bone conduction sensor 180M, to implement a heart rate detection function.

A key 190 includes a power key, a volume key, and the like. The key 190 may be a mechanical key, or a touch-type key. The electronic device may receive a key input, and generate a key signal input related to user setting and function control of the electronic device.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different areas of the flexible screen 194, the motor 191 may also correspond to different vibration feedback effects. Different application scenarios (for example, a time prompt, Information receiving, an alarm clock, and a game) may also correspond to different vibration feedback effects. A touch vibration feedback effect may be further customized.

In the embodiments of this application, the motor 191 can adopt various linear motors, and the processor 110 performs a driving program of the linear motor to drive the linear motor to operate. In addition, an adjustment solution of the driving waveform involved when the driving program of the linear motor drives the linear motor to operate is the adjustment method for a driving waveform provided in the following embodiments of this application.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or unplugged from the SIM card interface 195, to come into contact with or be separated from the electronic device. The electronic device may support one or N SIM card interfaces, and N is a positive integer greater than 1. The SIM card interface 195 may support a Nano SIM card, a Micro SIM card, a SIM card, and the like. A plurality of cards may be simultaneously inserted into the same SIM card interface 195. Types of the plurality of cards may be the same or different. The SIM card interface 195 may also be compatible with different types of SIM cards. The SIM card interface 195 may also be compatible with an external storage card. The electronic device interacts with the network by the SIM card to implement functions such as call and data communication. In some embodiments, the electronic device uses an eSIM, that is, an embedded SIM card. The eSIM card may be embedded in the electronic device and cannot be separated from the electronic device.

Figure 3A:
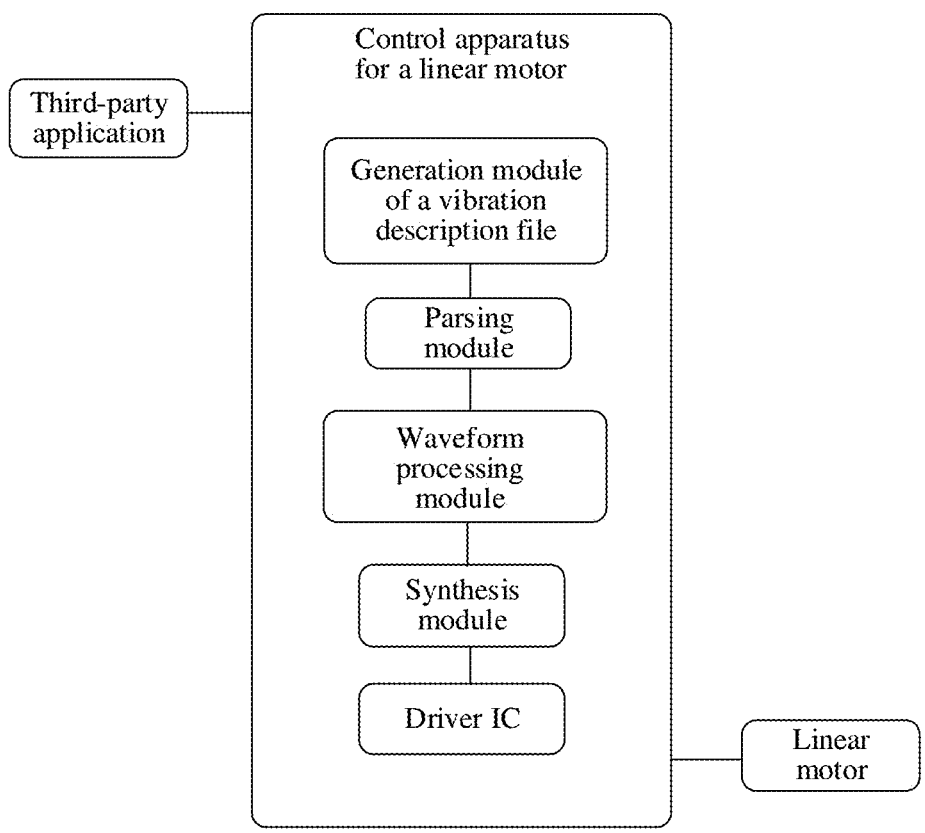
FIG. 3a is an example diagram of a software architecture applicable to an adjustment method for a vibration waveform of a linear motor according to an embodiment of this application.
Figure 3B:
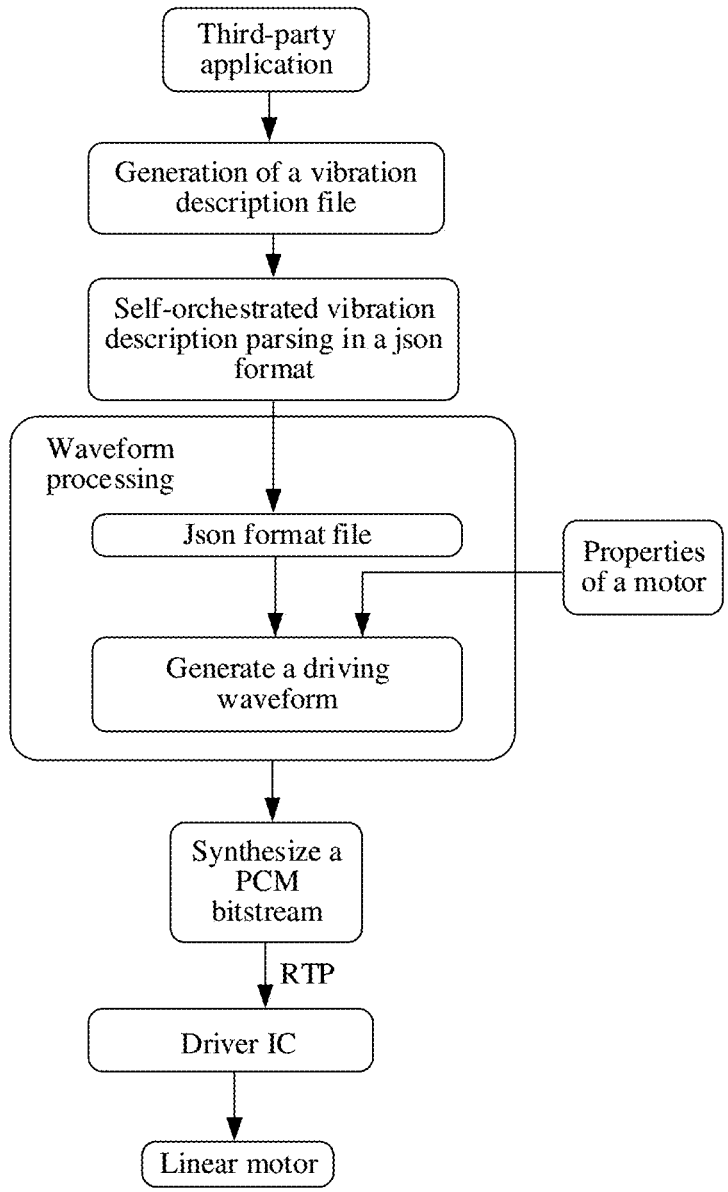

Further, FIG. 3a is an example diagram of a software architecture applicable to the technical solution disclosed in the embodiment of this application, and it can be known with reference to the content of FIG. 3b that:

a generation module (which can interact with a third-party application) of the vibration description file is configured to generate the vibration description file; and a parsing module parses the vibration description file to obtain a json format file for describing the vibration waveform, and a waveform processing module performs a waveform processing operation on the json format file to obtain the driving waveform. A synthesis module synthesizes the driving waveform obtained after the waveform processing module performs the waveform processing operation to obtain an audio bitstream in a format such as Pulse Code Modulation (Pulse Code Modulation, PCM) to transmit the audio bitstream by using a protocol such as a Real-time Transport Protocol (Real-time Transport Protocol, RTP) to an integrated circuit (Integrated Circuit, IC), and finally acts on the linear motor to control the operation of the linear motor.

With reference to the structure of the electronic device, the software architecture shown in FIG. 3a may be stored in the internal memory 121, and the processor 110 invokes the process described in FIG. 3b.

The adjustment method for a driving waveform of a linear motor described in the embodiment of this application is applicable to the waveform processing module in FIG. 3a. The adjustment method for a driving waveform of a linear motor is described in detail below.

Figure 4:
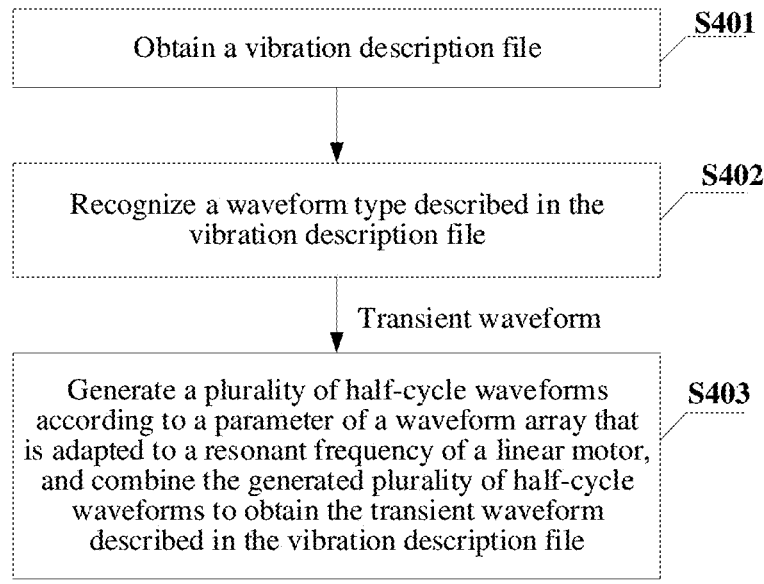
FIG. 4 to FIG. 6 are flowcharts of an adjustment method for a driving waveform according to three embodiments of this application.

FIG. 4 shows an adjustment method for a driving waveform, applicable to an electronic device, where the electronic device includes a linear motor. The adjustment method for a driving waveform includes:

S401. Obtain a vibration description file.

The vibration description file includes various types of vibration parameters. Each type of vibration parameter included in the vibration description file may be obtained by parsing the vibration description file, and the vibration waveform of the linear motor may be generated by using the vibration parameter. The vibration waveform of the linear motor may be understood as a displacement bitstream, which reflects displacements of the linear motor at different time points.

As described above, the rotor of the X-axis linear motor can move in the X-axis or Y-axis direction, and the rotor of the Z-axis linear motor can move in the Z-axis direction. Therefore, regardless of the type of a linear motor, the operation of the linear motor driven by the waveform is the operation of the rotor of the linear motor on a corresponding axis (an X axis, a Y axis or a Z axis). A representation form of the rotor moving on the corresponding axis is that the rotor moves along the corresponding axis at different moments, and the vibration sensation perceived by the user is brought about by displacement changes of the rotor along the corresponding axis at different moments.

The vibration parameters in the vibration description file may include, but are not limited to: intensity, sharpness (also referred to as frequency), a waveform type, a start time, and a stop time.

S402. Recognize a waveform type described in the vibration description file.

If the waveform type described in the vibration description file is a transient waveform, step S203 is performed.

The vibration parameter of the vibration description file includes the waveform type. It can be determined by analyzing the waveform type whether the vibration description file describes a steady-state waveform or a transient waveform.

It can be understood that the steady-state waveform is the vibration waveform that drives the linear motor to experience a rising phase, a stable vibration phase, and a stop phase. The rising phase, the stable vibration phase, and the stop phase are three phases that the linear motor experiences from the beginning of the vibration to the end of the vibration. In the rising phase, a vibration form of the linear motor is represented by free damping vibration accompanied by forced vibration. In the stable vibration phase, a vibration form of the linear motor is represented by steady-state forced vibration of equal amplitudes. In the stop phase, a vibration form of the linear motor is represented by the free damping vibration.

The transient waveform is a vibration waveform that drives the linear motor to experience only the rising phase.

S403. Generate a plurality of half-cycle waveforms according to a parameter of a waveform array that is adapted to a resonant frequency of the linear motor, and combine the generated plurality of half-cycle waveforms to obtain the transient waveform described in the vibration description file.

The vibration parameter included in the vibration description file defines the vibration waveform that needs to be generated. Therefore, a vibration waveform that meets the requirement of the vibration parameter may be generated based on the vibration parameter of the transient waveform described in the vibration description file. For example, the vibration parameter defined by the vibration description file includes a frequency of 230 hz. A vibration waveform with the frequency of 230 hz may be generated based on the vibration parameter.

However, as described above, because linear motors are different, frequencies (also referred to as the resonant frequency) to which the linear motors are adapted are different. When the frequency of the transient waveform described in the vibration description file does not match the resonant frequency of the linear motor, the vibration sensation of the linear motor does not meet a vibration sensation requirement of the transient waveform described in the vibration description file. Therefore, the vibration parameter of the transient waveform described in the vibration description file needs to be processed to generate a driving waveform whose frequency matches each resonant frequency of the linear motor. It may also be understood as that differences in resonant frequencies of linear motors need to be masked, and a plurality of linear motors with different resonant frequencies can be controlled to output the transient waveform described in the same vibration description file. For example, the vibration waveform with the frequency of 230 hz defined in the vibration description file needs to be outputted by the linear motor with the resonant frequency of 230 hz and the linear motor with the resonant frequency of 150 hz.

To ensure that the transient waveform described in the vibration description file can be outputted by the linear motors with different resonant frequencies, a waveform array corresponding to each resonant frequency of the linear motor is predefined and stored in the internal memory of the electronic device. The waveform array includes a plurality of half-cycle waveforms. Each half-cycle waveform is obtained by splitting the transient waveform adapted to the resonant frequency of the linear motor by using a half cycle of the transient waveform as a splitting unit. Certainly, the waveform array is stored in the internal memory of the electronic device, and the waveform array stores a frequency and an amplitude that are used for generating half-cycle waveforms.

In addition, a cycle of the transient waveform described in the vibration description file is fixed. For example, one transient waveform includes three cycles of waveforms, and a waveform array of a linear motor for each resonant frequency includes frequencies and amplitudes corresponding to six half-cycle waveforms.

In a case that the waveform type described in the vibration description file is the transient waveform, the waveform array corresponding to the resonant frequency of the linear motor in the electronic device is selected from the pre-stored waveform array corresponding to each resonant frequency. According to the frequencies and amplitudes of the plurality of half-cycle waveforms indicated in the waveform array, the half-cycle waveforms are generated, and the generated half-cycle waveforms are combined to obtain the transient waveform.

Figure 5:
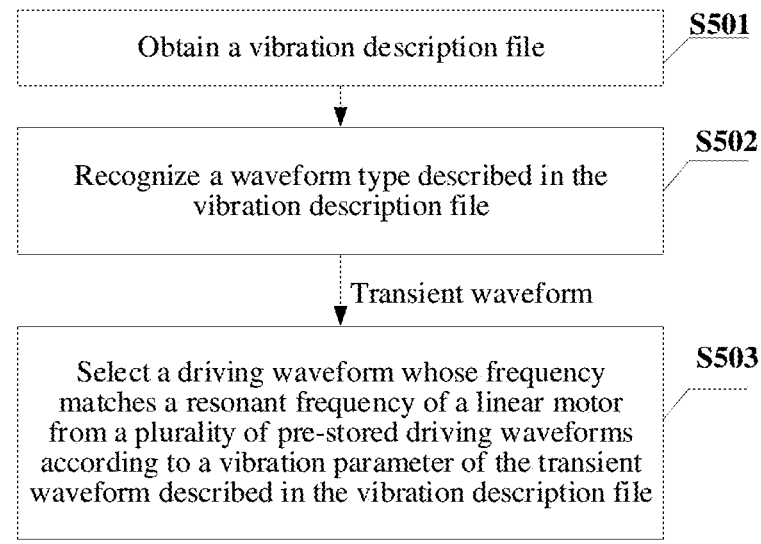

FIG. 5 shows another adjustment method for a driving waveform, also applicable to an electronic device. The electronic device includes a linear motor. The adjustment method for a driving waveform includes:

S501. Obtain a vibration description file.

S502. Recognize a waveform type described in the vibration description file.

If the waveform type described in the vibration description file is a transient waveform, step S503 is performed.

For specific content in step S501 and step S502, reference may be made to content in step S501 and step S502 in the corresponding embodiment in FIG. 4.

S503. Select a driving waveform whose frequency matches the resonant frequency of the linear motor from a plurality of pre-stored driving waveforms according to a vibration parameter of the transient waveform described in the vibration description file.

It can be understood that the driving waveform whose frequency matches the resonant frequency of the linear motor selected from the plurality of pre-stored driving waveforms also needs to meet a vibration parameter requirement of the transient waveform described in the vibration description file. In the manner in which a plurality of driving waveforms are pre-stored and a driving waveform is selected according to the vibration parameter of the transient waveform described in the vibration description file and the requirement of the resonant frequency of the linear motor to drive the linear motor, differences in resonant frequencies of linear motors can also be masked. Certainly, because the driving waveform is directly selected, the efficiency of obtaining the driving waveform can be higher.

Because the requirement of the resonant frequency of the linear motor is limited, different linear motors require driving waveforms with different resonant frequencies. Therefore, driving waveforms of linear motors that are adapted to different resonant frequencies can be pre-generated and stored in the internal memory of the electronic device. These pre-generated driving waveforms are referred to as atomic driving waveforms.

There are three manners of generating the atomic driving waveforms.

In the first manner, the driving waveform of each resonant frequency involved in the linear motor is used as the atomic driving waveform. In this way, it can be ensured that for each resonant frequency of the linear motor, an atomic driving waveform whose frequency matches the resonant frequency can be found from the stored atomic driving waveforms. However, the generation manner needs to occupy a relatively large storage space.

In the second manner, the driving waveform of each frequency in a frequency range involved in the linear motor is used as the atomic driving waveform. For example, a frequency range of all frequencies involved in the linear motor is 70 hz to 185 hz, and the driving waveform of each frequency in the frequency range is used as the atomic driving waveform; or the driving waveform of each frequency in a frequency range of 165 hz to 175 hz in a frequency range of 70 hz to 185 hz is used as the atomic driving waveform. Certainly, selection criteria for a specific frequency range within the frequency range in which the linear motor is involved may be a frequency range with a relatively high hit rate. The relatively high hit rate also refers to a range of frequencies used by most linear motors. Compared with the first manner, the quantity of atomic driving waveforms generated in the generation manner is relatively small, and there is no need to occupy a large storage space. As a result, an atomic driving waveform corresponding to the resonant frequency of the linear motor may not be found.

In the third manner, the driving waveform of the resonant frequency of the linear motor with a relatively high hit rate is used as the atomic driving waveform. The resonant frequency with a relatively high hit rate refers to the resonant frequency used by most linear motors among the resonant frequencies of a series of linear motors. For example, within a frequency range of 70 hz to 185 hz, frequencies such as 70 hz, 80 hz, 90 hz, 100 hz, 120 hz, 130 hz, 150 hz and 170 hz are resonant frequencies set for most linear motors, and are set as resonant frequencies with a relatively high hit rate. Based on the second generation manner, the requirement for storage space is further reduced. In addition, the probability that an atomic driving waveform corresponding to the resonant frequency of the linear motor fails to be found is also increased.

The transient waveform frequency described in the vibration description file is diverse, that is, it may be required that the linear motor operate according to waveforms of different frequencies. Based on this, each atomic driving waveform needs to include a plurality of driving waveforms, and each driving waveform is adapted to a frequency requirement of the transient waveform described in the vibration description file. For example, atomic driving waveforms of a linear motor with a resonant frequency of 165 hz include: a driving waveform corresponding to the transient waveform with a frequency of 80 hz, a driving waveform corresponding to the transient waveform with a frequency of 81 hz, a driving waveform corresponding to the transient waveform with a frequency of 82 hz, and so on.

It can be seen from the foregoing content that atomic driving waveforms adapted to different resonant frequencies of the linear motor are pre-stored. Therefore, for each resonant frequency of the linear motor, an atomic driving waveform whose frequency matches the resonant frequency of the linear motor can be selected from the stored atomic driving waveforms. In addition, because each atomic driving waveform includes driving waveforms adapted to various frequency requirements of the transient waveform described in the vibration description file, the driving waveform that conforms to a frequency of the transient waveform described in the vibration description file may be further selected from the selected adapted atomic driving waveforms. In this way, a linear motor with a plurality of resonant frequencies can be ensured, and the transient waveform described in the same vibration description file can be outputted, so that differences in resonant frequencies of linear motors are masked.

Based on the foregoing content, it can be known that the plurality of pre-stored driving waveforms are stored in groups, and one group of driving waveforms (that is, an atomic driving waveform described in the foregoing content) corresponds to one resonant frequency of the linear motor; and each group of driving waveforms includes at least one driving waveform, and each driving waveform is adapted to a frequency requirement of the transient waveform described in the vibration description file.

Therefore, an implementation of step S503 is:

selecting a group of driving waveforms whose frequency matches the resonant frequency of the linear motor from a plurality of groups of driving waveforms.

In an example, the vibration parameter of the vibration description file includes: a vibration frequency being 82 hz; and the resonant frequency of the linear motor is 165 hz. According to the manner of this step, a group of driving waveforms with a frequency of 165 hz is selected from a plurality of groups of driving waveforms.

The driving waveform is selected from the selected group of driving waveforms according to the vibration parameter of the transient waveform described in the vibration description file.

Based on the foregoing example, a group of driving waveforms with a frequency of 165 hz includes a plurality of driving waveforms, and each driving waveform is a frequency corresponding to the vibration waveform. Based on this, a driving waveform with a frequency of 82 hz is selected from a group of driving waveforms with a frequency of 165 hz.

In a possible implementation, the atomic driving waveform is generated and stored by using the second and third generation manners of the atomic driving waveform proposed above. If the atomic driving waveform whose frequency matches the resonant frequency of the linear motor cannot be selected from the plurality of pre-stored atomic driving waveforms, the atomic driving waveform that is closest to the resonant frequency of the linear motor is first selected from the stored atomic driving waveforms, and then from the selected atomic driving waveform, after the driving waveform is selected according to the vibration parameter of the transient waveform described in the vibration description file, an interpolation operation is performed on the selected driving waveform according to the resonant frequency of the linear motor to obtain a driving waveform whose frequency matches the resonant frequency of the linear motor. Being closest to the resonant frequency of the linear motor may be understood as a frequency being the same as the resonant frequency of the linear motor or a difference between a frequency and the resonant frequency of the linear motor is the smallest.

Optionally, an interpolation operation is performed on the selected driving waveform according to the resonant frequency of the linear motor, a resampling algorithm may be used to sample the driving waveform to obtain values of a plurality of sampling points, and then the values of the plurality of sampling points are inserted into the driving waveform to complete the adjustment of the driving waveform and obtain the driving waveform whose frequency matches the resonant frequency of the linear motor.

Figure 6:
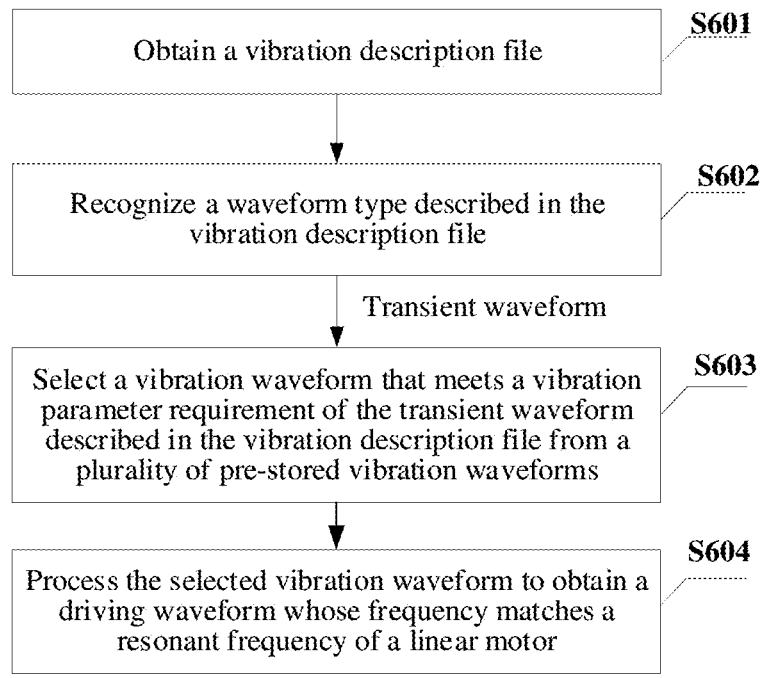

FIG. 6 shows another adjustment method for a driving waveform, also applicable to an electronic device. The electronic device includes a linear motor. The adjustment method for a driving waveform includes:

S601. Obtain a vibration description file.

S602. Recognize a waveform type described in the vibration description file.

If the waveform type described in the vibration description file is a transient waveform, step S603 is performed.

For specific content in step S601 and step S602, reference may be made to content in step S401 and step S402 in the corresponding embodiment in FIG. 4.

S603. Select a vibration waveform that meets a vibration parameter requirement of the transient waveform described in the vibration description file from a plurality of pre-stored vibration waveforms.

For the requirement of driving the linear motor to output vibration waveforms at different frequencies, the vibration waveforms (transient vibration waveforms) of a plurality of frequencies are pre-stored. If the waveform type described in the vibration description file is a transient waveform, a plurality of pre-stored vibration waveforms are screened according to the vibration parameter of the transient waveform described in the vibration description file to select a vibration waveform whose vibration parameter matches the vibration parameter of the transient waveform described in the vibration description file.

S604. Process the selected vibration waveform to obtain a driving waveform whose frequency matches the resonant frequency of the linear motor.

After the vibration waveform that meets the vibration parameter requirement of the transient waveform described in the vibration description file is selected, an inverse solution motor voltage driving algorithm is used to perform inverse operation on the vibration waveform to obtain the driving waveform whose frequency matches the resonant frequency of the linear motor.

In a process of performing the inverse operation on the vibration waveform by using the inverse solution motor voltage driving algorithm, the vibration waveform is adjusted according to the resonant frequency of the linear motor to obtain the driving waveform whose frequency matches the resonant frequency of the linear motor.

The inverse solution motor voltage driving algorithm has the function of performing inverse operation on the vibration waveform, so that the vibration waveform is adapted to the resonant frequency of the linear motor. In this embodiment, the objective of masking differences in resonant frequencies of linear motors is achieved by using the function of the algorithm.

It should further be noted that if the pre-stored vibration waveforms of a plurality of frequencies are insufficient to meet the requirement of driving the linear motor to produce output according to waveforms of all frequencies, then among the plurality of pre-stored vibration waveforms, the vibration waveform that conforms to the vibration parameter of the transient waveform described in the vibration description file cannot be selected. For example, the vibration waveform with a frequency range of 100 hz to 130 hz is pre-stored, and the frequency of the transient waveform described in the vibration description file is 135 hz. For a frequency requirement of 135 hz of the transient waveform described in the vibration description file, the vibration waveform of the same frequency fails to be found in the vibration waveform with a frequency range of 100 hz to 130 hz.

In this case, the vibration waveform that is closest to the vibration parameter of the transient waveform described in the vibration description file needs to be selected from the plurality of pre-stored vibration waveforms. Certainly, being closest refers to that the difference between the frequency and the vibration parameter of the transient waveform described in the vibration description file is the smallest. According to the vibration parameter of the transient waveform described in the vibration description file, an interpolation operation is performed on the selected vibration waveform to obtain a vibration waveform whose vibration parameter matches the vibration parameter of the transient waveform described in the vibration description file.

In a possible implementation, according to the vibration parameter of the transient waveform described in the vibration description file, an interpolation operation is performed on the selected vibration waveform, a resampling algorithm may be used to sample the vibration waveform to obtain values of a plurality of sampling points, and then the values of the plurality of sampling points are inserted into the vibration waveform to complete the adjustment of the vibration waveform and obtain the vibration waveform whose vibration parameter matches the vibration parameter of the transient waveform described in the vibration description file.

It should further be noted that the vibration waveform processing module and the driving waveform processing module use the content of three embodiments corresponding to FIG. 2, FIG. 3 or FIG. 4 to generate the driving waveform. The implementation principle may be understood as: generating the driving waveform of the linear motor according to the vibration parameter described in the vibration description file and the resonant frequency of the linear motor. In this way, it can be seen that: the driving waveform of the linear motor is generated according to the vibration parameter described in the vibration description file and the resonant frequency of the linear motor in a case that the waveform type described in the vibration description file is the transient waveform, so that it is ensured that the generated driving waveform of the linear motor can be adapted to the resonant frequency of the linear motor, and the transient waveform that masks differences in motors is generated to drive the linear motor.

Figure 7:
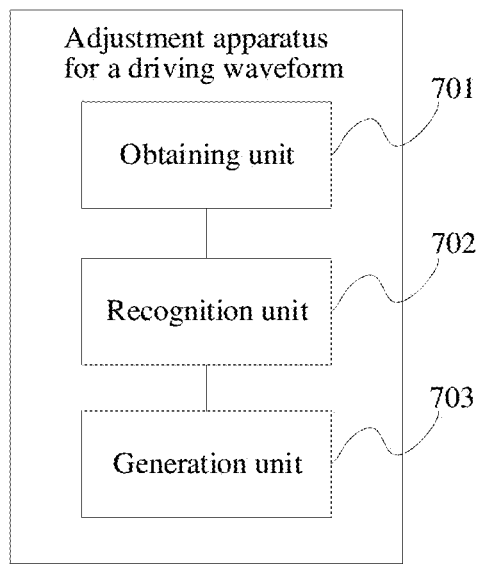
FIG. 7 is a structural diagram of an adjustment apparatus for a driving waveform according to another embodiment of this application.

An embodiment of this application provides an adjustment apparatus for a driving waveform, as shown in FIG. 7, including:

an obtaining unit 701, configured to obtain a vibration description file;

a recognition unit 702, configured to recognize a waveform type described in the vibration description file; and a generation unit 703, configured to generate a driving waveform of a linear motor according to a vibration parameter described in the vibration description file and a resonant frequency of the linear motor in a case that the waveform type described in the vibration description file is a transient waveform.

Optionally, in another embodiment of this application, when generating the driving waveform of the linear motor according to the vibration parameter described in the vibration description file and the resonant frequency of the linear motor, the generation unit 703 is configured to: generate a plurality of half-cycle waveforms according to a parameter of a waveform array that is adapted to the resonant frequency of the linear motor; and recombine the generated plurality of half-cycle waveforms to obtain the transient waveform described in the vibration description file.

Optionally, in another embodiment of this application, when performing the generating the driving waveform of the linear motor according to the vibration parameter described in the vibration description file and the resonant frequency of the linear motor, the generation unit 703 is configured to: select a driving waveform whose frequency matches the resonant frequency of the linear motor from a plurality of pre-stored driving waveforms, where the driving waveform whose frequency matches the resonant frequency of the linear motor meets a vibration parameter requirement of the transient waveform described in the vibration description file.

Optionally, in another embodiment of this application, the plurality of driving waveforms are stored in groups, and one group of driving waveforms corresponds to one resonant frequency of the linear motor; each group of driving waveforms includes at least one driving waveform, and each driving waveform is adapted to a frequency requirement of a vibration waveform of the linear motor;

when selecting the driving waveform whose frequency matches the resonant frequency of the linear motor from the plurality of pre-stored driving waveforms, where the driving waveform whose frequency matches the resonant frequency of the linear motor meets the vibration parameter requirement of the transient waveform described in the vibration description file, the generation unit 703 is configured to: select a group of driving waveforms whose frequency matches the resonant frequency of the linear motor from a plurality of groups of driving waveforms; and determine the driving waveform that meets the vibration parameter requirement of the transient waveform described in the vibration description file from the selected group of driving waveforms.

Optionally, in another embodiment of this application, when generating the driving waveform of the linear motor according to the vibration parameter described in the vibration description file and the resonant frequency of the linear motor, the generation unit 703 is configured to:

select a vibration waveform that meets a vibration parameter requirement of the transient waveform described in the vibration description file from a plurality of pre-stored vibration waveforms; and process the selected vibration waveform to obtain a driving waveform whose frequency matches the resonant frequency of the linear motor.

In the adjustment apparatus for a driving waveform provided in the foregoing several embodiments of this application, for a specific working process of the obtaining unit 701, the recognition unit 702, and the generation unit 703, reference may be made to the content of corresponding method embodiments. Details are not described herein again.

Another embodiment of this application provides a readable storage medium, an instruction in the readable storage medium, when executed by a processor of an electronic device, causing the electronic device to perform the adjustment method for a driving waveform in any of the foregoing embodiments.

Optionally, the readable storage medium may be a non-transitory computer-readable storage medium. For example, the non-temporary computer readable storage medium may be a ROM, a random access memory (RAM), a CD-ROM, a tape, a floppy disk, or an optical data storage device.

What is claimed is:

1. An adjustment method for a driving waveform, applicable to an electronic device, the electronic device comprising a linear motor, the method comprising:
   obtaining a vibration description file;
   recognizing a waveform type described in the vibration description file; and
   generating a driving waveform of the linear motor according to a vibration parameter described in the vibration description file and a resonant frequency of the linear motor in a case that the waveform type described in the vibration description file is a transient waveform.

2. The adjustment method for a driving waveform according to claim 1, wherein the generating a driving waveform of the linear motor according to a vibration parameter described in the vibration description file and a resonant frequency of the linear motor comprises:
   generating a plurality of half-cycle waveforms according to a parameter of a waveform array that is adapted to the resonant frequency of the linear motor; and
   combining the generated plurality of half-cycle waveforms to obtain the transient waveform described in the vibration description file.

3. The adjustment method for a driving waveform according to claim 1, wherein the generating a driving waveform of the linear motor according to a vibration parameter described in the vibration description file and a resonant frequency of the linear motor comprises:
   selecting a driving waveform whose frequency matches the resonant frequency of the linear motor from a plurality of pre-stored driving waveforms, wherein the driving waveform whose frequency matches the resonant frequency of the linear motor meets a vibration parameter requirement of the transient waveform described in the vibration description file.

4. The adjustment method for a driving waveform according to claim 3, wherein the plurality of pre-stored driving waveforms are stored in groups, and one group of driving waveforms corresponds to one resonant frequency of the linear motor; each group of driving waveforms comprises at least one driving waveform, and each driving waveform is adapted to a frequency requirement of a vibration waveform of the linear motor; and
   the selecting a driving waveform whose frequency matches the resonant frequency of the linear motor from a plurality of pre-stored driving waveforms, wherein the driving waveform whose frequency matches the resonant frequency of the linear motor meets a vibration parameter requirement of the transient waveform described in the vibration description file comprises:
   selecting a group of driving waveforms whose frequency matches the resonant frequency of the linear motor from a plurality of groups of driving waveforms; and
   determining the driving waveform that meets the vibration parameter requirement of the transient waveform described in the vibration description file from the selected group of driving waveforms.

5. The adjustment method for a driving waveform according to claim 1, wherein the generating a driving waveform of the linear motor according to a vibration parameter described in the vibration description file and a resonant frequency of the linear motor comprises:
   selecting a vibration waveform that meets a vibration parameter requirement of the transient waveform described in the vibration description file from a plurality of pre-stored vibration waveforms; and processing the selected vibration waveform to obtain a driving waveform whose frequency matches the resonant frequency of the linear motor.

6. The adjustment method for a driving waveform according to claim 1, wherein vibration parameters described in the vibration description file comprise intensity, sharpness, the waveform type, a start time, and a stop time.

7. The adjustment method for a driving waveform according to claim 1, wherein the transient waveform is a vibration waveform that drives the linear motor to experience only a rising phase and not a stable vibration phase or a stop phase.

8. An adjustment apparatus for a driving waveform, comprising:
an obtaining unit, configured to obtain a vibration description file;
a recognition unit, configured to recognize a waveform type described in the vibration description file; and
a generation unit, configured to generate a driving waveform of a linear motor according to a vibration parameter described in the vibration description file and a resonant frequency of the linear motor in a case that the waveform type described in the vibration description file is a transient waveform.

9. The adjustment apparatus for a driving waveform according to claim 8, wherein when generating the driving waveform of the linear motor according to the vibration parameter described in the vibration description file and the resonant frequency of the linear motor, the generation unit is configured to: generate a plurality of half-cycle waveforms according to a parameter of a waveform array that is adapted to the resonant frequency of the linear motor; and combining the generated plurality of half-cycle waveforms to obtain the transient waveform described in the vibration description file.

10. The adjustment apparatus for a driving waveform according to claim 8, wherein when generating the driving waveform of the linear motor according to the vibration parameter described in the vibration description file and the resonant frequency of the linear motor, the generation unit is configured to: select a driving waveform whose frequency matches the resonant frequency of the linear motor from a plurality of pre-stored driving waveforms, wherein the driving waveform whose frequency matches the resonant frequency of the linear motor meets a vibration parameter requirement of the transient waveform described in the vibration description file.

11. The adjustment apparatus for a driving waveform according to claim 10, wherein the plurality of pre-stored driving waveforms are stored in groups, and one group of driving waveforms corresponds to one resonant frequency of the linear motor; each group of driving waveforms comprises at least one driving waveform, and each driving waveform is adapted to a frequency requirement of a vibration waveform of the linear motor;
when selecting the driving waveform whose frequency matches the resonant frequency of the linear motor from the plurality of pre-stored driving waveforms, wherein the driving waveform whose frequency matches the resonant frequency of the linear motor meets the vibration parameter requirement of the transient waveform described in the vibration description file, the generation unit is configured to: select a group of driving waveforms whose frequency matches the resonant frequency of the linear motor from a plurality of groups of driving waveforms; and
determining the driving waveform that meets the vibration parameter requirement of the transient waveform described in the vibration description file from the selected group of driving waveforms.

12. The adjustment apparatus for a driving waveform according to claim 8, wherein when generating the driving waveform of the linear motor according to the vibration parameter described in the vibration description file and the resonant frequency of the linear motor, the generation unit is configured to:
selecting a vibration waveform that meets a vibration parameter requirement of the transient waveform described in the vibration description file from a plurality of pre-stored vibration waveforms; and
processing the selected vibration waveform to obtain a driving waveform whose frequency matches the resonant frequency of the linear motor.

13. The adjustment apparatus for a driving waveform according to claim 8, wherein vibration parameters described in the vibration description file comprise intensity, sharpness, the waveform type, a start time, and a stop time.

14. An electronic device, comprising:
a linear motor;
one or more processors; and
a memory, storing a program,
the program, when executed by the one or more processors, causing the one or more processors to implement the following operations:
obtaining a vibration description file;
recognizing a waveform type described in the vibration description file; and
generating a driving waveform of the linear motor according to a vibration parameter described in the vibration description file and a resonant frequency of the linear motor in a case that the waveform type described in the vibration description file is a transient waveform.

15. The electronic device according to claim 14, wherein the generating a driving waveform of the linear motor according to a vibration parameter described in the vibration description file and a resonant frequency of the linear motor comprises:
generating a plurality of half-cycle waveforms according to a parameter of a waveform array that is adapted to the resonant frequency of the linear motor; and
combining the generated plurality of half-cycle waveforms to obtain the transient waveform described in the vibration description file.

16. The electronic device according to claim 14, wherein the generating a driving waveform of the linear motor according to a vibration parameter described in the vibration description file and a resonant frequency of the linear motor comprises:
selecting a driving waveform whose frequency matches the resonant frequency of the linear motor from a plurality of pre-stored driving waveforms, wherein the driving waveform whose frequency matches the resonant frequency of the linear motor meets a vibration parameter requirement of the transient waveform described in the vibration description file.

17. The electronic device according to claim 16, wherein the plurality of pre-stored driving waveforms are stored in groups, and one group of driving waveforms corresponds to one resonant frequency of the linear motor; each group of driving waveforms comprises at least one driving waveform, and each driving waveform is adapted to a frequency requirement of a vibration waveform of the linear motor; and the selecting a driving waveform whose frequency matches the resonant frequency of the linear motor from a plurality of pre-stored driving waveforms, wherein the driving waveform whose frequency matches the resonant frequency of the linear motor meets a vibration parameter requirement of the transient waveform described in the vibration description file comprises:

selecting a group of driving waveforms whose frequency matches the resonant frequency of the linear motor from a plurality of groups of driving waveforms; and determining the driving waveform that meets the vibration parameter requirement of the transient waveform described in the vibration description file from the selected group of driving waveforms.

18. The electronic device according to claim 14, wherein the generating a driving waveform of the linear motor according to a vibration parameter described in the vibration description file and a resonant frequency of the linear motor comprises:

selecting a vibration waveform that meets a vibration parameter requirement of the transient waveform described in the vibration description file from a plurality of pre-stored vibration waveforms; and processing the selected vibration waveform to obtain a driving waveform whose frequency matches the resonant frequency of the linear motor.

19. The electronic device according to claim 14, wherein vibration parameters described in the vibration description file comprise intensity, sharpness, the waveform type, a start time, and a stop time.

* * * * *